United States Patent Office 2,842,592
Patented July 8, 1958

2,842,592
GLUTAMIC ACID RECOVERY

Forest A. Hoglan, Glenview, Ill., assignor to International Minerals & Chemical Corporation, a corporation of New York No Drawing. Application December 12, 1956
Serial No. 627,741
7 Claims. (Cl. 260—527)

This invention relates to a process for recovery of glutamic acid from glutamic acid mother substances. More particularly, it relates to a process for recovery of glutamic acid from waste liquors, such as Steffen's filtrate, containing glutamic acid mother substances, and for minimizing the loss of glutamic acid in the resulting end liquor.

Glutamic acid is commercially produced from beet sugar waste liquors such as Steffen's filtrate by hydrolysis in the presence of calcium hydroxide, sodium hydroxide, and/or potassium hydroxide. Calcium hydroxide is inferior as a hydrolytic agent, especially in liquors of high solids content (i. e., above about 25% by weight of dry solids). Sodium and potassium ions are comparatively difficult to remove from the hydrolyzate, requiring neutralization with a mineral acid, concentration to a high solids content, and crystallization of the inorganic salt. Even under the best conditions this leaves a salt concentration great enough to interfere with glutamic acid crystallization. A need clearly exists for an effective hydrolytic agent which can be removed from the hydrolyzate conveniently and completely.

It has also been observed that the prior-art processes yield a so-called "end liquor" containing 25 to 40% or more of the original glutamic acid values, from which the glutamic acid values cannot readily be recovered. This liquor represents a considerable waste which the art has not heretofore been able to avoid by any economically feasible method.

It is an object of this invention to provide an improved method for recovering increased yields of glutamic acid from waste liquors containing glutamic acid mother substances.

It is a further object of the instant invention to provide a commercially feasible process for the recovery of increased yields of glutamic acid from Steffen's filtrate.

A further object of the instant invention is to provide a process for the recovery of glutamic acid from waste liquors containing glutamic acid mother substances with substantially lower loss of glutamic acid in the end liquor as compared with glutamic acid recovery processes utilized in the past.

In accordance with the present invention, a waste water of beet sugar molasses, such as concentrated Steffen's filtrate, is hydrolyzed with strontium hydroxide or preferably barium hydroxide or a mixture thereof. The resulting hydrolyzate is adjusted to a pH between about 8 and about 12 with a reagent which forms a salt of low water solubility with the hydrolytic reagent. For example, the hydrolyzate is treated with sulfur dioxide, sulfuric acid, or preferably carbon dioxide, and the insoluble barium or strontium salt is separated from the hydrolyzate, for example by filtration. Sulfuric acid is added to the resulting filtrate or solution from which the solids have been separated to reduce the pH to between about 4 and about 7, preferably between about 4.5 and about 5.5, and the adjusted solution is concentrated to crystallize inorganic salts, which are separated, for example by filtration. The resulting solution from which the salts have been separated is adjusted with sulfuric acid to a pH between about 2.5 and about 4.0, preferably between about 3.2 and about 3.6, and glutamic acid is crystallized and the crystals separated therefrom.

In the case of waste liquors such as Steffen's filtrate, barium hydroxide is the preferred hydrolytic reagent; however, strontium hydroxide may also be employed, either alone or in combination with barium hydroxide. The waste liquor is hydrolyzed by heating at elevated temperature for a sufficient length of time to substantially completely hydrolyze the glutamic acid mother substances in the waste water. The hydrolyzate is treated with a reagent which will precipitate the hydrolytic reagent; for example carbon dioxide, sulfur dioxide, sulfuric acid, or sulfite or carbonate salts, and the like may be employed. The insoluble precipitate is then separated, for example by filtration. The resulting solution is adjusted with sulfuric acid to a pH between about 4.5 and about 5.5, preferably about 5, and the adjusted solution is concentrated for example to between about 50 and about 90% by weight of the original concentrated Steffen's filtrate. Precipitated solid material is separated from the solution. Glutamic acid is crystallized from the resulting solution at its isoelectric point, pH 3.2.

By operating in the foregoing manner, particularly when carbon dioxide is used for removing the hydrolytic agent, I have found that extraordinarily low glutamic acid losses occur in the end liquor produced. When treating concentrated Steffen's filtrate ("CSF"), for example, the amount of end liquor produced is of the order of about 55% of the weight of the concentrated Steffen's filtrate input as compared to 75% in the conventional process employing NaOH hydrolysis and HCl acidulation. The glutamic acid in the end liquor produced in accordance with the instant invention averages about 35% less than for the conventional NaOH—HCl process. Thus the process of this invention not only produces a 50% smaller volume of end liquor than the conventional process, but the end liquor produced contains only about two-thirds as much monosodium glutamate equivalent ("MSGE") per unit weight. My invention is superior in general to the processes of the prior art in these respects, as will be seen from the following comparison of results in the treatment of a concentrated Steffen's filtrate obtained from sugar beets grown west of the Rocky Mountains, this material being commonly referred to as "concentrated Wester Slope Steffen's filtrate";

| Hydrolytic agent | $Ba(OH)_2$ | $Ba(OH)_2$ | NaOH | NaOH |
|---|---|---|---|---|
| Acidulant | $H_2SO_4$ | HCl | $H_2SO_4$ | HCl |
| MSGE content of end liquor, percent | 1.67 | 2.06 | 2.29 | 2.55 |
| End liquor weight per 100 parts of CSF solids | 92 | 97.5 | 115 | 130 |

In another embodiment of the invention, thin barium filtrate is subjected to autohydrolysis, and the resulting hydrolyzate is treated as set forth hereinabove. This barium filtrate is the residual solution remaining after the precipitation of sugar from beet sugar molasses as barium saccharate. Thin barium filtrate contains about 80% water, along with hydroxides of barium, sodium, and potassium, some sugar and other carbohydrates, organic acids, and nitrogenous substances, including glutamic acid and glutamic acid mother substances, such as pyrrolidonecarboxylic acid. This material, as discharged from the desugarizing process and prior to carbonation and concentration, possesses some alkalinity in the form of dissolved barium, sodium, and potassium hydroxides, sufficient to produce a pH of about 10 to about 12 or higher. If stored in an insulated vessel at the discharge temperature, around 95° C., it cools slowly, and simultaneously the glutamic acid mother substances undergo autohydrolysis. Nearly complete hydrolysis takes place in from about 3 to about 120 hours at a temperature between about 95 and about 55° C. Further hydrolysis may then be produced if desired by concentrating the hydrolyzate to a dry solids content between about 40 and about 80% by weght. Alternatively, the autohydrolysis and concentration may be carried out simultaneously.

According to a preferred embodiment, concentrated Steffen's filtrate having a solids content of about 70% by weight is diluted with about one-fourth its weight of water and barium hydroxide is added to the diluted filtrate in an amount of about 20% by weight, based on the weight of the original concentrated Steffen's filtrate. The reaction mixture is heated at a temperature between about 65 and about 100° C., preferably about 85° C., for a period ranging between about 1 and about 8 hours, preferably about 2½ hours. The hydrolyzate is then cooled to about 60° C. and treated with carbon dioxide to adjust the pH to a value between about 8.0 and about 12.0. Preferably, the pH of the hydrolyzate is adjusted to a pH at least as low as the pH of the starting concentrated Steffen's filtrate, which is ordinarily between about 9.5 and about 10.5 for Western Slope filtrate, and up to about 11.5 for Rocky Mountain filtrate. The carbonation reaction results in the formation of a barium carbonate precipitate which may be removed by filtration. In place of carbonation, the hydrolyzate may be adjusted to a pH between about 8.0 and about 12.0 with any other reagent which forms a water-insoluble barium salt. Sulfuric acid, sulfur dioxide, alkali-metal carbonate, such as sodium carbonate, sodium bicarbonate, and the corresponding alkali metal sulfites, and the like, are suitable for this purpose, but best results are obtained with carbon dioxide. The treatment of the hydrolyzate with such an acidic reagent to adjust the pH to between about 8.0 and about 12.0 results in the substantially complete removal of barium ions from the hydrolyzate, and the hydrolyzate is thereafter free from contamination in this respect. The resulting solution is then further treated as set forth hereinabove to recover the glutamic acid values therefrom.

The hydrolysis of concentrated Steffen's filtrate, concentrated barium filtrate, or other waste liquors of this type does not proceed in an efficient manner using barium hydroxide or strontium hydroxide as the hydrolyzing agent unless water is added or removed to adjust the solids content to between about 25 and about 55% by weight. Preferably, the solids content of the filtrate to be hydrolyzed will amount to between about 40 and about 50% by weight. The hydrolysis is carried out at a temperature between about 65 and about 100° C., preferably about 85° C. The time necessary to effect substantially complete hydrolysis of the glutamic acid precursor compounds will vary depending upon the solids concentration of the liquor being hydrolyzed, the temperature of hydrolysis, and the amount of hydrolytic agent utilized. Ordinarily, the hydrolysis will be completed within about 1 to about 5 hours. The hydrolysis of a Steffen's filtrate which has been adjusted to a dry solids content of about 45% by weight can be completed at a temperature of about 85° C. in between about 2 and about 3 hours using about 20% barium hydroxide by weight, based on the filtrate. By "substantially completely hydrolyzed" is meant a conversion of between about 95 and about 100% of glutamic acid precursor compounds to glutamic acid.

In accordance with the present invention, substantially improved recoveries of glutamic acid are possible, compared with the processes of the prior art. Recoveries vary according to the type of starting material, but I have found it possible, for example, to recover around 80 to 90% or more of the glutamic acid from concentrated Steffen's filtrate or concentrated barium filtrate containing above about 300 pounds of monosodium glutamate equivalent per ton of solids.

The barium hydroxide or strontium hydroxide utilized as the hydrolyzing agent in this process is recovered as the carbonate, sulfite, or sulfate salt, depending upon the particular acidic reagent used for the initial pH adjustment of the hydrolyzate. The carbonate or sulfite thus recovered can be reconverted to the oxide by heating and reused in the process. Losses of barium or strontium are extremely low and the recovery of barium or strontium from the salt precipitated is almost quantitative.

The following examples are illustrative of specific embodiments of this invention. All parts and percentages are by weight unless otherwise indicated.

*Example 1*

About 1000 parts of concentrated Steffen's filtrate having a solids content of about 60% were diluted with 250 parts of water, and barium hydroxide in the amount of 210 parts was added. The reaction mixture was subjected to hydrolysis by heating at about 85° C., for 2¼ hours. After cooling to about 60° C., carbon dioxide was bubbled into the hydrolyzate until the pH reached about 9.0. The barium carbonate which formed was separated from the hydrolyzate by filtration, and the filter cake was washed. About 100 parts of 50% sulfuric acid were added to the filtrate to reduce the pH to about 4.5. The adjusted filtrate was treated with 80 parts of a 10% aqueous tannin solution and the resulting precipitate was filtered after about ½ hour. The filtrate remaining from the tannin treatment was concentrated in vacuo to about 1040 parts, then heated to about 80° C. and filtered to remove inorganic solids. The resulting solution was adjusted to pH 3.2 with 50% sulfuric acid and allowed to crystallize for 5 days with occasional stirring. The yield of glutamic acid amounted to 81.5% of the glutamic acid values in the concentrated Steffen's filtrate starting material. The crude end liquor remaining after the removal of glutamic acid contained only 1.32% glutamic acid equivalent.

*Example 2*

About 200 grams of concentrated Steffen's filtrate having a specific gravity of about 1.32 were mixed with about 40 grams of solid barium hydroxide and about 50 milliliters of water. The resulting mixture was subjected to hydrolysis by heating at about 85° C. for about 2¼ hours. After cooling to about atmospheric temperature carbon dioxide was bubbled into the hydrolyzate until the pH reached about 9. The barium carbonate which formed was separated from the hydrolyzate by filtration, and the filter cake was washed. About 16 grams of 50% sulfuric acid were added to the filtrate to reduce the pH to about 5. The adjusted solution was concentrated in vacuo to about 135 grams. Inorganic solids were separated from the concentrated solution by filtration. About 30 grams of 50% sulfuric acid were added to the resulting filtrate to reduce the pH to about 3.2, and the resulting solution was allowed to stand for 5 days. The glutamic acid which crystallized from the liquor was separateed by filtration. The glutamic acid end liquor was adjusted to a pH of about 2.5 with 50% sulfuric acid, and was then admixed with about 1 milliliter of methanol per gram of adjusted end liquor. After stirring for several minutes, the precipitate which formed was separated by filtration. On the basis of original end liquor employed, the resulting demineralized end liquor contained less than 1% ash and contained about 90% of the glutamic acid initially present in the glutamic acid end liquor.

*Example 3*

A blend of concentrated Steffen's filtrate and vinasse was prepared in a 3:1 ratio of the dry solids contained therein. Based on 2,000 parts of dry solids, the blend contained 1300 parts of water, 136 parts of sodium chloride, and 333 parts of glutamic acid values calculated as monosodium L-glutamate (hereinafter referred to as "monosodium glutamate equivalent" or "MSGE").

A portion of the blend containing 2,000 parts of dry solids was commingled with 45 parts of soda ash and filtered to remove calcium. To the filtrate were added 960 parts of Ba(OH)$_2$.8H$_2$O and 1065 parts of water, and the mixture was heated at 85° C. for 160 minutes to effect hydrolysis of the glutamic acid precursors therein.

The hydrolyzate was carbonated at 80° C. to pH 9.0 with 145 parts of carbon dioxide, then filtered at 60–70° C., and the barium carbonate cake was washed with 4180 parts of water. The filtrate and wash water were combined with 6184 parts of acidic recycle streams from a previous batch, containing 1715 parts of solids, and acidified to pH 5.4 with 111 parts of 50% sulfuric acid. The mixture was cooled below 40° C. and commingled with 149 parts of an aqueous solution containing 15 parts of tannin. The resulting tannin cake was filtered off at 35° C. and washed with 108 parts of an aqueous solution containing 6 parts of sodium chloride.

The tannin filtrate, measuring 14,957 parts and containing 3704 parts of solids, was concentrated at reduced pressure to 4489 parts and the resulting crop of organic salts was filtered off at 70° C. The inorganic cake was repulped with 725 parts of water, refiltered, and washed with 80 parts of water. The repulp and wash waters were segregated for return to the first acidulation (pH 5.4) of a succeeding batch.

The filtrate from the inorganic salt separation (2890 parts, containing 2318 parts of solids) was adjusted to pH 3.1 with 643 parts of 50% H$_2$SO$_4$ and allowed to stand with gentle stirring at ordinary temperature for 138 hours while a crude glutamic acid product crystallized therefrom. The resulting slurry was filtered and 1292 parts of a crude glutamic acid cake were obtained containing 1185 parts of dry solids, including 316 parts of MSGE. The end liquor measured 2241 parts and contained 1437 parts of solids, including only 58 parts of MSGE.

The crude glutamic acid cake was repulped with a solution of 34 parts of sodium chloride in 2310 parts of water, plus a recycle mother liquor from the crystallization of purified glutamic acid in a preceding cycle, the mother liquor containing 1079 parts of water and 137 parts of dry solids, including 92 parts of sodium chloride and 25 parts of MSGE. The slurry was centrifuged, and the cake was washed with 174 parts of water. The liquid phase and wash water were recycled to hydrolyzate following the carbonation step of a succeeding cycle.

The washed glutamic acid cake, weighing 409 parts and containing 259 parts of dry solids, including 270 parts of MSGE, was purified in a conventional manner by carbon treatment in aqueous solution at pH 6.0, followed by recrystallization at pH 3.1. The mother liquor from the latter step was recycled as set forth hereinabove. The purified product measured 229 parts, and contained 13 parts of water and 244 parts of MSGE in substantially pure form.

The term "waste liquors containing glutamic acid precursor compounds" as utilized in this description and claims, refers to waste liquors, such as Steffen's filtrate, barium filtrate, and the like, which are obtained as by-products in the sugar beet industry following the removal of sugar from beet molasses, and to residual liquors from the fermentation thereof, such as vinasse, schlempe, citric acid fermentation residues, and the like. "Steffen's filtrate" refers to waste liquors remaining following the separation of sugar from beet sugar molasses by precipitation as calcium saccharate. Similarly, "barium filtrate" refers to waste liquors remaining following the separation of sugar from beet sugar molasses by precipitation as barium saccharate.

The term "end liquor" as used in the description and claims refers to the liquor obtained by hydrolyzing a material containing glutamic acid mother substances and crystallizing and separating glutamic acid from the hydrolyzate.

The invention described and claimed in the present application is fully disclosed in my earlier applications, Serial No. 365,559, filed July 1, 1953, now U. S. Patent 2,713,592 (July 19, 1955), and Serial No. 501,208, filed April 13, 1955, now abandoned, the latter having been copendent with both the later-filed present application and the earlier-filed Serial No. 365,559. The present application is accordingly a continuation-in-part of Serial No. 501,208 and, through the latter, of Serial No. 365,559. The present application is also a continuation-in-part of my U. S. Patent 2,799,704, which issued July 16, 1957, on a copending application, Serial No. 501,203, filed April 13, 1955.

In accordance with the foregoing description, I claim as my invention:

1. A process which comprises hydrolyzing waste liquor from beet sugar molasses at elevated temperature with an alkaline earth metal hydroxide selected from the group consisting of barium hydroxide and strontium hydroxide, adjusting the resulting hydrolyzate to a pH between about 8 and about 12 with an inorganic reagent which precipitates the alkaline earth metal as a water-insoluble salt, separating the insoluble solids from the hydrolyzate, adjusting the resulting solution to a pH between about 4 and about 7.5 with sulfuric acid, crystallizing and separating inorganic salts from the hydrolyzate, adjusting the pH of the resulting solution to between about 2.5 and about 4.0 with sulfuric acid, and crystallizing and separating glutamic acid from the adjusted solution, whereby end liquor loses of glutamic acid are substantially reduced.

2. The process of claim 1 wherein said waste liquor is concentrated Steffen's filtrate.

3. The process of claim 2 wherein said concentrated Steffen's filtrate is adjusted to a dry solids content between about 25 and about 55% by weight prior to hydrolysis.

4. The process of claim 1 wherein said waste liquor is barium filtrate.

5. The process of claim 4 wherein said barium filtrate is subjected to autohydrolysis.

6. A process which comprises hydrolyzing waste liquor from beet sugar molasses at elevated temperature with barium hydroxide, adjusting the resulting hydrolyzate to a pH between about 8 and about 12 with carbon dioxide, separating the resulting barium carbonate from the hydrolyzate, adjusting the pH of the hydrolyzate with sulfuric acid to a pH between about 4.5 and about 5.5, concentrating the adjusted hydrolyzate, separating insoluble solids therefrom, adjusting the pH of the resulting solution with sulfuric acid to between about 2.5 and about 4.0, and separating the glutamic acid which crystallizes therefrom, whereby end liquor losses of glutamic acid are substantially reduced.

7. An improved process for the recovery of glutamic acid from Steffen's filtrate, which comprises adjusting the dry solids content of said Steffen's filtrate to between about 25 and 55% by weight, hydrolyzing the adjusted filtrate at a temperature between about 65 and about 100° C. with barium hydroxide, neutralizing the resulting hydrolyzate to a pH between about 8 and about 12 with carbon dioxide, separating the resulting barium carbonate from the hydrolyzate, adjusting the pH of the resulting hydrolyzate with sulfuric acid to between about 4.5 and about 5.5, concentrating the adjusted hydrolyzate to between about 60 and about 90% of the original weight of the concentrated Steffen's filtrate, separating insoluble solids therefrom, adjusting the pH of the resulting solution with sulfuric acid to around 3.2, and separating the glutamic acid which crystallizes therefrom, whereby end liquor losses of glutamic acid are substantially reduced and the recovery of glutamic acid is substantially improved.

References Cited in the file of this patent
UNITED STATES PATENTS

| 1,582,472 | Ikeda | Apr. 27, 1926 |
| 2,713,592 | Hoglan | July 19, 1955 |